United States Patent [19]

Nguyen et al.

[11] Patent Number: 5,247,467
[45] Date of Patent: Sep. 21, 1993

[54] MULTIPLE VARIABLE COMPENSATION FOR TRANSDUCERS

[75] Inventors: Bich Nguyen, San Jose; John F. Schipper, Palo Alto, both of Calif.

[73] Assignee: Hewlett-Packard Company, Palo Alto, Calif.

[21] Appl. No.: 394,617

[22] Filed: Aug. 16, 1989

[51] Int. Cl.5 .................. G06F 15/56; G06F 15/31
[52] U.S. Cl. ............................ 364/571.02; 364/572; 364/553
[58] Field of Search ............. 364/571.01, 571.02, 364/571.03, 571.04, 510, 553, 572, 574; 341/118, 119, 120

[56] References Cited

U.S. PATENT DOCUMENTS

| 4,149,254 | 4/1979 | Molusis | 364/510 |
|---|---|---|---|
| 4,192,005 | 3/1980 | Kurtz | 364/571 |
| 4,390,956 | 6/1983 | Cornforth et al. | 364/510 |
| 4,416,153 | 11/1983 | Williams | 73/295 |
| 4,437,164 | 3/1984 | Branch | 364/571 |
| 4,581,946 | 4/1986 | Kanayama | 364/510 |
| 4,592,002 | 5/1986 | Bozarth et al. | 364/571 |
| 4,622,843 | 11/1986 | Hormel | 364/571.01 |
| 4,675,835 | 6/1987 | Pfleiderer | 364/571.02 |
| 4,710,631 | 12/1987 | Aotsuka et al. | 250/354.1 |
| 4,734,873 | 3/1988 | Malloy et al. | 364/571 |
| 4,765,188 | 8/1988 | Krechmery et al. | 73/708 |
| 4,873,655 | 10/1989 | Kondraske | 364/553 |

Primary Examiner—Kevin J. Teska

[57] ABSTRACT

Method and apparatus for calibration of sensors and transducers that (a) takes account of the fact that the output variable value may behave differently as a function of the input variable value in different regions of the input variable value and (b) takes account of variation of the output variable value with changes in a plurality of supplemental variables, for a fixed value of the input variable. A discrete set of reference values of each supplemental variable is chosen, and the representation of output variable value as a function of input variable value is determined for each of the set of reference values of the supplemental variables. The representation is then extended to arbitrary values of the supplemental variables by linear or quadratic interpolation.

18 Claims, 2 Drawing Sheets

MULTIPLE VARIABLE COMPENSATION FOR TRANSDUCERS

DESCRIPTION

1. Technical Field

This invention relates to compensation for an electrical device that produces a signal representing one output variable, such as a measurement of electrical power, as a function of principal input variable, such as measured voltage and as a function of a plurality of supplemental input variables.

2. Background of the Invention

In the use of an electrical transducer to produce an output electrical variable, such as measured electrical power, from the value of an input electrical variable, such as voltage, the device usually incorporates a sequence of experimentally determined data points relating the input and output variables. These data points, expressed as a graph of input variable versus output variable, define a locus of points that can often be roughly represented by a simple mathematical relationship between the input and output variables. Often, the output variable behaves qualitatively and quantitatively differently for different ranges of values of the input variable. Further, variations in other supplemental variables such as ambient temperature and a frequency that characterizes the input signal also affect the value of the output variable for a fixed input variable value. Variation of the value of the output variable with respect to changes in ambient temperature or in input signal frequency may be expressed by means of a temperature sensitivity parameter and a frequency sensitivity parameter, respectively.

As used herein, a "transducer" will refer to a device that receives an input variable (electrical or non-electrical), measures the input variable value, and issues a corresponding value of an output variable (electrical or non-electrical) that characterizes or corresponds to the input variable. As one example, an electrical voltage input variable may be characterized by a corresponding electrical power output variable. As another example, a temperature differential in a device that relies on the Seebeck effect may correspond to an electrical current produced across the Seebeck junction by that temperature differential.

With reference to temperature sensitivity, for many sensors the temperature sensitivity is large and positive for low values of radio frequency power, and is small and is negative for large values of radio frequency power. Further, temperature sensitivity varies significantly from one unit to another of the same model of sensor. This unit-to-unit variation in temperature sensitivity can be as much as a factor of 3 or more for some of the classes of devices tested.

With reference to frequency sensitivity, frequency response is a function of power level as well as a function of ambient temperature. Frequency sensitivity is larger for low values of radio frequency power than it is for high values of radio frequency power. Further, the deviation can be negative for low radio frequency power and positive, but of smaller magnitude, for high radio frequency power.

In the past, others have compensated for the effects of variations in supplemental variables, such as temperature, on device output. In U.S. Pat. No. 4,416,153, issued to Williams, a liquid level monitoring system has a thermistor sensor attached to the tank containing the liquid, and tank temperature is sensed and used to store and produce a linear variation of voltage threshold with tank temperature to produce modified voltage threshold values that indicate liquid level in the tank.

Bozarth et al., in U.S. Pat. No. 4,592,002, disclose a temperature-sensitive digital-to-analog converter that is provided with a temperature sensing device and the converter output signal is characterized as a function of the input digital data value and temperature. The characterization equation, expressed as a function of the input digital data values with a simple variation with converter temperature, is determined once and stored in a non-volatile memory.

Temperature compensation for a semiconductor light source is disclosed by Aotsuka et al. in U.S. Pat. No. 4,710,631. Temperature of the light source is sensed, and correction coefficients are computed and stored. These coefficients take into account variations with temperature of radiation intensity and spectral characteristics of the light source. Ambient temperature is sensed and a correction coefficient is applied, without further computation, to maintain approximately constant exposure conditions.

Compensation, in terms of two supplemental variables such as temperature T and static pressure S, of a device that measures a process variable pressure PV as a function primarily of differential pressure P, is disclosed by Malloy in U.S. Pat. No. 4,734,873. The output pressure variable PV is expressed as a polynomial in the differential pressure P, with polynomial coefficients that depend upon the variables S and T. However, little specific information is disclosed on determination of the polynomial coefficients for compensation purposes.

Krechmery et al. disclose a pressure transducer with ambient temperature compensation in U.S. Pat. No. 4,765,188. A temperature-sensitive resistor is deposited on a pressure-sensitive diaphragm, and the sensed temperature signal is converted to a digital signal that addresses a pre-programmed data correction table stored in a programmable read-only memory. The numerical data correction is converted to an analog correction signal that corrects the sensed pressure value for ambient temperature of the pressure sensor.

These inventions do not explicitly account for the possibility that the output variable value may behave qualitatively differently for different non-overlapping ranges of the input variable. These inventions also do not provide for explicit representation of variation of output variable values with changing values of two or more supplemental variables that are independent of the input variable value.

What is needed is a compensation procedure that (1) takes account of the fact that the output variable value may behave differently for different ranges of the input variable value and (2) provides for explicit representation of the variation of output variable value with variation of two or more supplemental variables, such as ambient temperature and input signal frequency, for a fixed value of the input variable.

SUMMARY OF THE INVENTION

These needs are met by a compensation method and apparatus that first determines a set of ranges for the input variable, in each of which the value of the output variable may be represented by a different functional relationship to the input variable value. One example is representation of the output variable value by a polynomial in the input variable value, with polynomial coefficients that change from one range to another. Another example is representation by a power law, a trigonometric function, a transcendental function or an orthonormal basis set of functions in different ranges of the input variable.

The inventive approach requires an initial choice of a set of discrete reference temperatures and of a set of discrete reference input signal frequencies or other supplemental variables and determines the functional relationship for a fixed reference temperature and a fixed reference frequency in each of the ranges of the input variable value. For a fixed value of the input variable, this representation is extended by interpolation to all temperatures between the minimum and maximum reference temperatures and to all frequencies between the minimum and maximum reference frequencies. If the functional relationship of output variable and input variable is expressed as a polynomial or other function in each of the ranges of the input variable value, this interpolation may be made by linear or quadratic interpolation of the polynomial coefficients or by interpolation of the resulting value of the output variable.

For a fixed choice of the supplemental variables temperature and frequency, the functional relationships of the output and the input variables may be determined and stored in tables for each range of the input variable value, for future use. The method extends to compensation for each of $n(>2)$ supplemental variables.

A full scale value for the input variable is determined, and a corresponding full scale value for the output variable is determined, using the functional relationships between the output variable and the input variable. The output variable value may then be normalized by division by its full scale value, and the computed output variable value, determined from a prescription of the values of the input variable and the supplemental variables, may be converted from analog form to digital form for subsequent display or further processing.

This approach offers a number of advantages relative to other calibration methods used for electrical or non-electrical sensors. This approach also offers better accuracy, as compared to hardware interpolation and computation of temperature-induced deviations. This approach also offers better control of corrections than does a method that provides a single function for representation of the input variable versus output variable functional relationship. If polynomials are used to express this functional relationship, low order polynomials, such as cubic, may be used for representation, which allows for faster computation and allows temperature and frequency interpolation to be done on the polynomial coefficients. The method also allows use of an arbitrary number of ranges of the input variable value, although for some purposes a small number such as four ranges is found to be adequate. The invention provides and algorithm to match coefficients in the functional relationships between adjacent ranges of the input variable value so that the end point values computed in adjacent segments will agree with one another. Finally, the invention extends to compensation for $n(>2)$ supplemental variables.

BEST MODE FOR CARRYING OUT THE INVENTION

Figure 1:
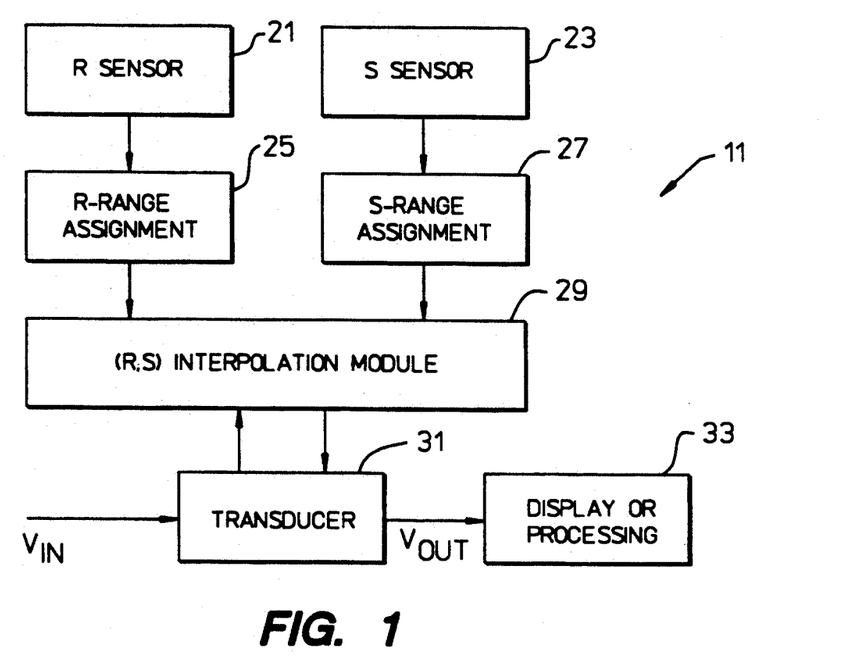
FIG. 1 is a block diagram of the compensation configuration for two supplemental variables, applied to correction of a calibrated transducer output in accord with the invention.

With reference to FIG. 1, the apparatus 11 considered here is a device that receives an input variable $v_{in}$ as an input signal and produces a different output signal in the form of an output variable $v_{out}$, where the value of the output variable depends upon the value of the input variable and upon values of one, two or more supplemental variables R and S that serve as control input variables for the apparatus 11. Two supplemental variable sensors 21 and 23 sense the present values of the two supplemental variables R and S, respectively. For example, R and S might be apparatus temperature and input signal frequency, as described below. The sensed values of the variables R and S are passed to two range tables 25 and 27 that determine the supplemental variable ranges, such as $R_i \leq R \leq R_{i+1}$ and $S_j \leq S \leq S_{j+1}$, that contain these variables. Each of the variables R and S is determined to lie in a particular one of the ranges for that variable, and the two identified ranges are passed to an interpolation module 29 that contains the coefficients for the reference values (upper and lower limits) for the two ranges that contain the variables R and S. With these reference values in hand, the interpolation module 29 computes four interpolation coefficients, which may be of the forms $$R_{i+1}-R)(S_{j+1}-S)/(R_{i+1}-R_i)(S_{j+1}-S_j),$$
$$(R-R_i)(S_{j+1}-S)/(R_{i+1}-R_i)(S_{j+1}-S_j),$$
$$(R_{i+1}-R)(S-S_j)/(R_{i+1}-R_i)(S_{j+1}-S_j),$$

and $(R-R_i)(S-S_j)/(R_{i+1}-R_i)(S_{j+1}-S_j)$, corresponding to the four coordinate pairs $(R_a, S_b)$ ($a=i$ or $i+1$; $b=j$ or $j+1$). These interpolation coefficients are passed to an input variable transducer 31 to be combined with certain function coefficients $a_k(R_a, S_b)$ to produce the interpolated function coefficients $a_k(R,S)$ that determine the transducer output variable value $v_{out}$. This last signal value is then passed to another module 33 (optional) for display or subsequent processing. Alternatively, the function coefficients may be stored in the transducer 31 and passed to the interpolation module 29 whenever needed to form a new group of interpolation coefficients.

One example used here for illustration assigns to the input variable $v_{in}$ the instantaneous or average voltage of an electrical signal and assigns to the output variable $v_{out}$ the electrical power P produced by that input variable. Two supplemental variables mentioned above for this example are ambient temperature T in which the transducer operates and an input signal frequency f that characterizes the time variation of the input variable $v_{in}$. It should be understood that this choice of input variable, output variable and supplemental variables is made solely for purposes of illustration and that any other reasonable choices of these variables may be made in calibration and compensation of an electrical or nonelectrical device for purposes of subsequent use of the transducer. The compensation method described and claimed here is intended to apply to general functional relationships between an input variable and an output variable, with $n(\geq 2)$ supplemental variables.

Figure 2:
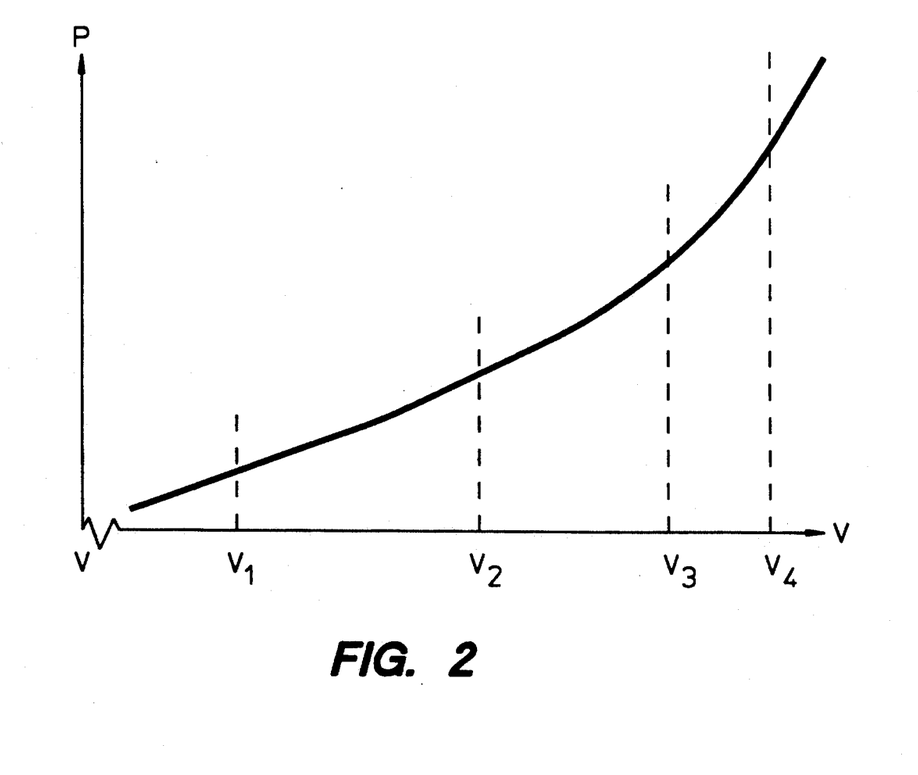
FIG. 2 is a graphic view, illustrating a possible functional relationship between the values of an input variable V and the values of an output variable P in each of a sequence of ranges of the input variable value.

As an illustrative example, consider a transducer that receives an input electrical signal, determines the voltage V of that input signal, and determines and displays the electrical power P associated with that input signal. Assuming that all other relevant physical variables are fixed, FIG. 2 displays a representative functional relationship between the output power P and the input voltage V as determined by the transducer. This functional relationship is generally derived by graphic display and examination of a sequence of data points $\{(V_s, P_s)\}_s$, as illustrated in FIG. 2, where $P_s$ is the observed value of output power corresponding to an observed value $V_s$ of the input voltage. The continuous curve shown in FIG. 2 is determined, according to the method of the invention, by choosing a sequence of voltage break points $V_0$, $V_1$, $V_2$, $V_3$ and $V_4$ so that, within each voltage range $V_r \leq V < V_{r+1}$ (r=0,1,2,3), the functional relationship between voltage V and power P is represented by a simple mathematical function such as a polynomial, a power law variation, a transcendental function or other similar function.

The functional relationship within each voltage range is determined by fitting a predetermined mathematical function that has adjustable coefficients or parameters to the sub-sequence of data points $\{(V_s, P_s)\}_s$ for which the first value $V_s$ in each pair $(V_s, P_s)$ lies in the chosen voltage range. The adjustable coefficients or parameters of the mathematical function are chosen so that the portion of the curve shown in FIG. 2 for that voltage range passes through or lies sufficiently close to those data points so that the error in use of the chosen function for representation is less some predetermined normalized error, such as five percent. For the input and output variables V and P, respectively, the approach disclosed here allows determination of a functional relationship in which the normalized error is actually less than one percent. The function coefficients or parameters are readjusted, if necessary, so that the function values at the coincident end points, such as $V_1$, $V_2$ and $V_3$ of two adjacent voltage ranges are the same for the two functions used in the adjacent voltage ranges. This method is not limited to a choice of four voltage ranges.

Assume, for purposes of illustration here, that the functional relationship within each voltage range shown in FIG. 2 is a polynomial $$P(V) = \sum_{k=0}^{L} a_k(V)^k, \qquad (1)$$

where the polynomial coefficients ak now define the functional relationship within the chosen voltage range and L is a positive integer. For a transducer relating output power to input voltage, it is often true that the relationship between P and V is linear in the lowest lying voltage range $V_0 \leq V < V_1$ so that the polynomial corresponding to this voltage range has the form $P = a_0 + a_1 V$. However, this feature is not required in the invention.

It is assumed that the mathematical expressions for the functional relationships between the input voltage V and the output power P are determined for each of the voltage ranges shown in FIG. 2, for each of a set of first supplemental variables $H_R = \{R_1, R_2, \ldots, R_M\}$ ($R_1 < R_2 < \ldots < R_M$) and for each of a set of second supplemental variables $H_S = \{S_1, S_2, \ldots, S_N\}$ ($S_1 < S_2 < \ldots < S_N$), with M and N being fixed integers. For any one of the voltage ranges shown in FIG. 2, the functional relationship between the input voltage V and output power P will vary according to the reference pair $(R_i, S_j)$ ($i=1,2,\ldots,M; j=1,2,\ldots,N$) of supplemental variables chosen for the sequence of data points used to determine that relationship. Thus, for each of the M·N reference pairs $(R_i, S_j)$, a set of polynomials shown in equation (1) above, will be determined for the set of voltage ranges shown in FIG. 2.

Figure 3:
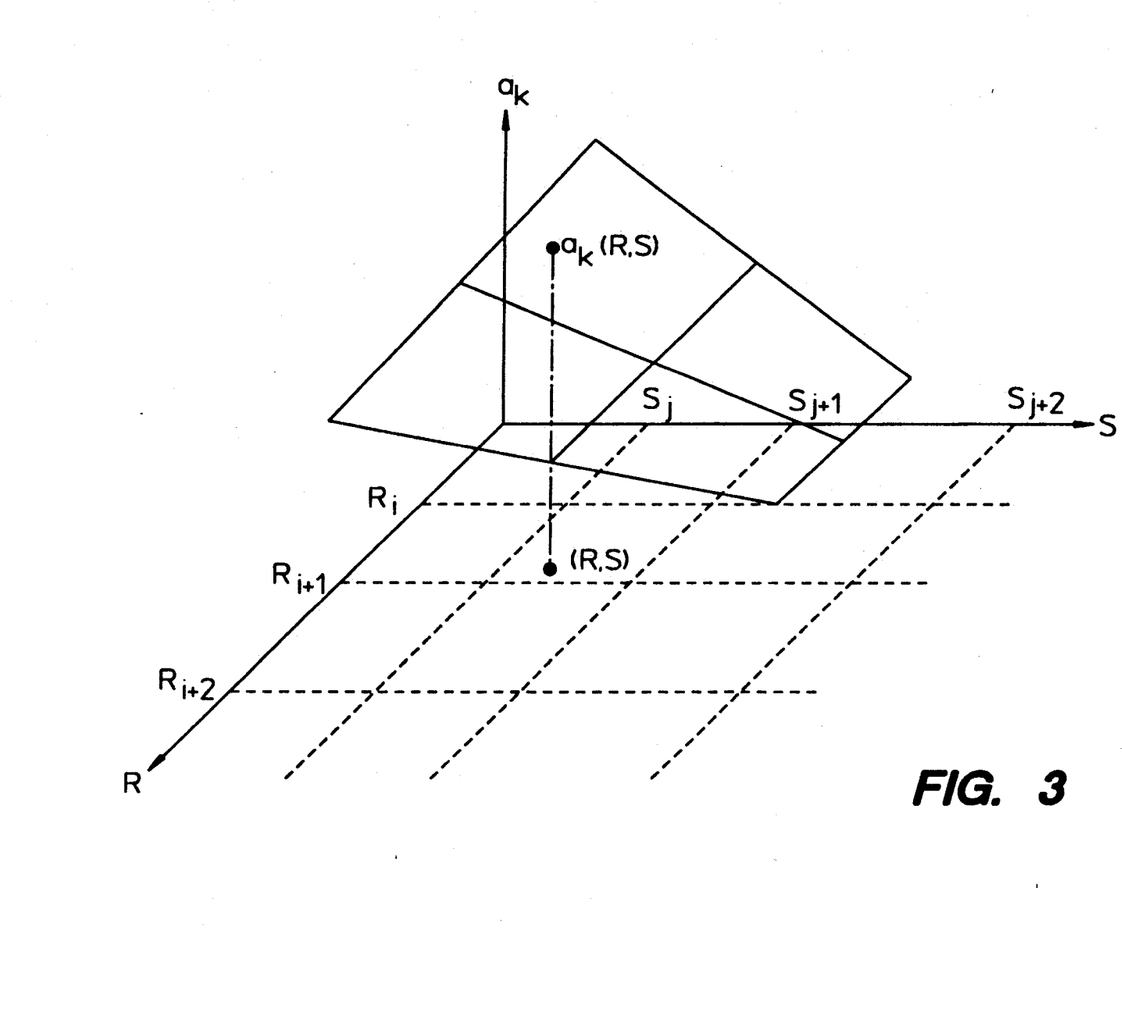
FIG. 3 is a graphic view, illustrating the relationship between four adjacent pairs or nine adjacent pairs of reference values of two supplemental variables R and S and an arbitrarily chosen temperature-frequency pair that lies within one of the quadrilaterals defined by the reference value pairs in accord with the invention.

In order to extend the representation shown in equation (1) to arbitrary values of the supplemental variables R and S that satisfy $R_1 \leq R \leq R_M$ and $S_1 \leq S \leq S_N$, the polynomial coefficients ak are interpolated by use of the relationship $$a_k(R,S) = \{a_k(R_i, S_j)(R_{i+1} - R)(S_{j+1} - S) + \qquad (2)$$

$$a_k(R_{i+1}, S_j)(R - R_i)(S_{j+1} - S) +$$

$$a_k(R_i, S_{j+1})(R_{i+1} - R)(S - S_j) +$$

$$a_k(R_{i+1}, S_{j+1})(R - R_i)(S - S_j)\}/(R_{i+1} - R_i)(S_{j+1} -$$

$$S_j)(R_i \leq R \leq R_{i+1}, S_j \leq S \leq S_{j+1}),$$

whenever a supplemental variable pair (R,S) lies in one of the reference pair quadrilaterals ($R_1 \leq R \leq R_{i+1}$; $S_j \leq S \leq S_{j+1}$), as illustrated in FIG. 3. The interpolated coefficient $a_k(R,S)$ is uniquely determined, although it may be expressed differently, if the coefficient is of the form $a_k(R,S) = a_{00} + a_{10}R + a_{01}S + a_{11}RS$ and it is required that $a_k(R,S) = a_k(R_a, S_b)$ for $R = R_a$ and $S = S_b$ with a=i or i+1 and b=j or j+1.

Equation (2) for interpolation with respect to two supplemental variables is easily extended to interpolation with respect to a larger number n of supplemental variables. For example, in order to compensate for n=3 supplemental variables, denoted (Q,R,S) with $Q_h \leq Q \leq Q_{h+1}$, $R_i \leq R \leq R_{i+1}$ and $S_j \leq S \leq S_{j+1}$, the equation (2) would be replaced by the relationship $$a_k(Q,R,S) = [a_k(Q_h, R_i, S_j)(Q_{h+1} - Q)(R_{i+1} - R)(S_{j+1} - S) + \qquad (3)$$

$$a_k(Q_{h+1}, R_i, S_j)(Q - Q_h)(R_{i+1} - R)(S_{j+1} - S) +$$

$$a_k(Q_h, R_{i+1}, S_j)(Q_{h+1} - Q)(R - R_i)(S_{j+1} - S) +$$

$$a_k(Q_h, R_i, S_{j+1})(Q_{h+1} - Q)(R_{i+1} - R)(S - S_j) +$$

$$a_k(Q_{h+1}, R_{i+1}, S_j)(Q - Q_h)(R - R_i)(S_{j+1} - S) +$$

$$a_k(Q_{h+1}, R_i, S_{j+1})(Q - Q_h)(R_{i+1} - R)(S - S_j) +$$

$$a_k(Q_h, R_{i+1}, S_{j+1})(Q_{h+1} - Q)(R - R_i)(S - S_j) +$$

$$a_k(Q_{h+1}, R_{i+1}, S_{j+1})(Q - Q_h)(R - R_i)(S - S_j)]/(Q_{h+1} -$$

$$Q_h)(R_{i+1} - R_i)(S_{j+1} - S_j).$$

Three suitable supplemental variables might be ambient relative humidity, ambient temperature and input signal frequency. The apparatus illustrated in FIG. 1 for n=2 supplemental variables extends to n>3 supplemental variables, in a manner that should be clear to one of ordinary skill in the art.

One of the advantages of using the polynomials shown in equation (1) above to represent the functional relationship between input voltage V and output power P is that the polynomial coefficients themselves are the only quantities that change with variation of the supplemental variables R and S here. One can, of course, replace the power law variation of the individual terms $(v_{in})^k$ shown in equation (1) above by a more general prescription $$P(V) = \sum_{k=0}^{L} c_k(Q_a, R_b, S_c) F_k(V), \quad (4)$$

where the multiplier coefficients $c_k$ are adjustable and the functions $F_k(V)$ are power law functions, trigonometric functions, transcendental functions, an orthonormal basis set of functions or other well-behaved functions, chosen to provide a good approximation for P as a function of the input variable V in eq. (4). The coefficients $c_k(Q_a, R_b, S_c)$ in equation (4) may be extended to general values of the supplemental variables Q, R and S by replacing the polynomial coefficients $a_k(Q_a, R_b, S_c)$ in equation (3) by the function coefficients $c_k(Q_a, R_b, S_c)$ with a=h or h+1, b=i or i+1 and c=j or j+1. The function $F_k(v_{in})$ might be chosen to be a simple power law function $(v_{in})^k$, a k-order orthonormal polynomial such as a Legendre, Laguerre or Hermite polynomial, or a sinusoidal function such as sin[k $v_{in}+\phi$] or cos[k $v_{in}+\phi$] for k=0,1, ..., L. However, if the functions $F_k(V)$ are allowed to depend on internal parameters that change with variation of the supplemental variables R and S, it will in general not be possible to interpolate the variation of output power P by merely interpolating the multiplier coefficients $c_k$ in equation (3). The method of compensation discussed thus far allows representation of the output power P from a sensor in terms of the primary input variable, which is the voltage V of the input signal, and of supplemental variables such as ambient temperature T and characteristic input signal frequency f. These considerations are easily generalized to determination of the representation of a general output variable $v_{out}$ in terms of a primary input variable $v_{in}$ and a plurality of n(>2) supplemental variables $S_1, S_2, \ldots, S_n$, as indicated above.

The linear interpolation procedure for the interpolated function coefficients $c_k(R,S)$ can be extended to quadratic interpolation, using the format illustrated in FIG. 3. For the rectangle defined by $$R_i \leq R \leq R_{i+2},$$

$$S_j \leq S \leq S_{j+2},$$

the general form of a function $e_k(R,S)$ that is quadratic in R for a fixed value of S and that is quadratic in S for a fixed value of R is $$e_k(R,S) = e_{00,k} + e_{10,k}R + e_{01,k}S + e_{20,k}R^2 + e_{11,k}RS + e_{02,k}S^2 + e_{21,k}R^2S + e_{12,k}RS^2 + e_{22,k}R^2S^2 \quad (5)$$

The coefficients $e_{mn}$ are as yet unknown constants that are to be chosen to satisfy the constraints $$e(R=R_p, S=S_q) = c_k(R_p, S_q) \quad (p=i, i+1, i+2; q=j, j+1, j+2). \quad (6)$$

This yields nine linear equations for the nine unknown coefficients $e_{mn,k}$ and can be written in matrix form as $$M(R_i, R_{i+1}, R_{i+2}; S_j, S_{j+1}, S_{j+2}) E_k = C_k, \quad (7)$$

where M is a 9×9 matrix, $E_k$ is a 9×1 column matrix whose entries are the unknowns $e_{00,k}, e_{01,k}, \ldots, e_{22,k}$, and $C_k$ is a 9×1 column matrix whose entries are the known coefficients $c_k(R_p, S_q)$ (p=i, i+1, i+2; q=j, j+1, j+2). The determinant of the matrix M vanishes only if at least two of the coordinates $R_i, R_{i+1}$, and $R_{i+2}$ are equal or at least two of the coordinates $S_j, S_{j+1}$ and $S_{j+2}$ are equal, which does not occur here. Thus the inverse matrix $M^{-1}$ exists, and the formal solution of eq. (6) becomes $$E_k = M(R_i, R_{i+1}, R_{i+2}; S_j, S_{j+1}, S_{j+2})^{-1} C_k. \quad (8)$$

The matrix M will be referred to here as the quadratic interpolation matrix and has the entries 1, $R_p$, $S_q$, $R_p^2$, $R_p S_q$, $S_q^2$, $R_p^2 S_q$, $R_p S_q^2$ and $R_p^2 S_q^2$ (p=i, i+1, i+2; q=j, j+1, j+2) for any row of the matrix M. The solution $E_k$ shown in eq. (8) is unique so that any other method of determining the coefficients $e_{mn}$ in eq. (5) for which the nine equations (6) are satisfied, will be identical to the coefficients $e_{mn}$ determined from eq. (8).

A second method of determining the coefficients $e_{mn}$ in eq.(5) that satisfy the nine equations (6) is to construct a sum of nine terms for the function e(R,S) so that precisely eight of these nine terms vanish for each choice $(R,S) = (R_p, S_q)$ (p=i, i+1, i+2; q=j, j+1, j+2) of the pair of coordinates, and the ninth surviving term that does not vanish is equal to $a_k(R_p, S_q)$. It can be verified by inspection that the following choice satisfies eq. (6) is quadratic separately in the variables R and S:

$$a_k(R,S) = \sum_{p=i}^{i+2} \sum_{q=j}^{j+2} a_k(R_p, S_q) g_p(R) h_q(S) \quad (9)$$

$$g_p(R) = \prod_{\substack{m=1 \\ m \neq p}}^{2} \frac{(R_m - R)}{(R_m - R_p)}, \quad (10)$$

$$h_q(S) = \prod_{\substack{n=1 \\ n \neq q}}^{2} \frac{(S_n - S)}{(S_n - S_q)}, \quad (11)$$

where the symbol $$\prod_{m=A}^{B} x_m = x_A \cdot x_{A+1} \ldots x_B$$

is the usual product symbol. This solution of the nine eqs. (6) has the advantages that it explicitly exhibits the solution and no matrix inversion is required.

The coefficients $c_k(R_i, S_j)$ may be interpolated linearly with respect to both supplemental variables R and S, may be interpolated linearly with respect to one variable and quadratically with respect to the other variable, or may be interpolated quadratically with respect referred to collectively herein as interpolation "at most quadratically" with respect to the two variables.

Preferably, the input variable break points $V_r$ (r=0,1,2,3,4 in FIG. 2) are chosen and fixed for all transducers of a given type or model. The break points may be chosen so that the amount of curvature exhibited by the continuous curve in FIG. 2 that represents the input variable-output variable relationship, is approximately the same in each range. For the example above, this insures that the value of output power P with input voltage V will not vary too quickly in any one of the voltage ranges. However, other criteria may also be used to determine the break points.

Where a sequence of voltage ranges $V_m < v_{in} < V_{m+1}$ ($m = 0, 1, \ldots, M-1$) is used, a problem may arise concerning matching of the function values $v_{out}$ at a common end point or break point of two adjacent voltage ranges. For example, if the polynomial representations $$v_{out}^{(-)} = a_0 + a_1 v_{in} + a_2 (v_{in})^2 + a_3 (v_{in})^3 \quad (V_{m-1} \leq v_{in} \leq V_m), \tag{12}$$

$$v_{out}^{(+)} = b_0 + b_1 v_{in} + b_2 (v_{in})^2 + b_3 (v_{in})^3 \quad (V_m \leq v_{in} \leq V_{m+1}) \tag{13}$$

are used, it may occur that these two representations do not agree at the common end point $v_{in} = V_m$ so that $$v_{out}^{(+)}(v_{in} = V_m) - v_{out}^{(-)}(v_{in} = V_m) = \Delta_m \neq 0. \tag{14}$$

The polynomial coefficients are adjusted by replacing the coefficients $a_x$ and $b_y$ by new coefficients that are defined by $$a_0' = a_0,$$

$$a_1' = a_1,$$

$$a_2' = a_2 \Delta_m / 4 V_m^2,$$

$$a_3' = a_3 + \Delta_m / 4 V_m^3,$$

$$b_0' = b_0 - \Delta_m / 4,$$

$$b_1' = b_1 - \Delta_m / 4 V_m,$$

$$b_2' = b_2,$$

$$b_3' = b_3. \tag{15}$$

If this approach is followed for each of the common voltage range endpoints, the resulting differences $v_{out}^{(+)}(v_{in} = V_m) - v_{out}^{(-)}(v_{in} = V_m)$ are often found to be small enough to be ignored. If these adjustments are made serially at each voltage range point ("common endpoint") that is shared by two adjacent voltage ranges, it may occur that the coefficient adjustments made with respect to one endpoint are compromised by the coefficient adjustments made at the next consecutive endpoint. In such event, the coefficient adjustment procedure should be repeated, beginning at a common endpoint at one end and moving through consecutive common endpoints toward the opposite end. After a few iterations of this procedure, the differences or errors $\Delta_m$ at all common endpoints should decrease to acceptably small amounts and the iteration procedure can be terminated. The coefficient adjustment procedure illustrated here is merely one of many such procedures that can be applied.

For the more general case of polynomial representations $$P(v_{in}) = v_{out}^{(-)} = \sum_{k=0}^{L} a_{k1}^{(m)}(R_i, S_j)(v_{in})^k \quad (V_{m-1} \leq v_{in} \leq V_m), \tag{16}$$

$$P(v_{in}) = v_{out}^{(+)} = \sum_{k=0}^{L} a_{k2}^{(m)}(R_i, S_j)(v_{in})^k \quad (V_m \leq v_{in} \leq V_{m+1}), \tag{17}$$

with $m = 1, 2, \ldots, p-1$, define the endpoint error $\Delta_m$ by the relation $$\Delta_m = v_{out}^{(+)}(v_{in} = V_m) - v_{out}^{(-)}(v_{in} = V_m). \tag{18}$$

For any choice of a non-negative integer M satisfying $0 \leq M < L$, the adjusted coefficients can be determined by the relations $$a_{k1}^{(m)}(R_i, S_j)' = a_{k1}^{(m)}(R_i, S_j)(k = 0, 1, \ldots, M), \tag{19}$$

$$a_{k1}^{(m)}(R_i, S_j)' = a_{k1}^{(m)}(R_i, S_j) + \frac{\Delta_m}{2(L - M)(V_m)^k} \tag{20}$$

$$(k = M + 1, \ldots, L),$$

$$a_{k2}^{(m)}(R_i, S_j)' = a_{k2}^{(m)}(R_i, S_j) - \frac{\Delta_m}{2(M + 1)(V_m)^k} \tag{21}$$

$$(k = 0, 1, \ldots, M),$$

$$a_{k2}^{(m)}(R_i, S_j)' = a_{k2}^{(m)}(R_i, S_j)(k = M + 1, \ldots, L). \tag{22}$$

The coefficients $a_{k1}^{(m)'}$ and $a_{k2}^{(m)'}$ may be iteratively adjusted for the sequence of common endpoints $v_{in} = V_m$ ($m = 1, 2, \ldots, p-1$) until the redefined output values approximately coincide at the common endpoints $v_{in} = V_m$.

In a preferred embodiment in which the supplemental variables are temperature T and frequency f, the number M of reference temperatures is five and the reference temperatures themselves are T = 0, 15, 25, 35 and 55° C. In this preferred embodiment the number N of reference frequencies is seven and the reference frequencies are 1, 6, 12, 18, 25 and 26.5 gigacycles/sec. For a representative peak power transducer, four voltage ranges are often sufficient, and the use of cubic polynomials (L = 3) in equation (1) above allows a reasonably accurate representation of the functional relationship between input voltage V and output power P, with an associated normalized error of less than five percent in each voltage range defined by two consecutive voltage break points. For a fixed voltage range, chosen temperature and chosen input frequency (not necessarily a reference temperature or a reference frequency), the number of function coefficients needed for variation of input voltage V in that voltage range is $7 \times 5 \times 4 \times 4 = 560$ coefficients. This number of coefficients is stored in a coefficient storage unit such as a PROM or an EPROM or an EEPROM for subsequent transfer to a fast acting random access memory for use by the transducer. If the voltage break points are the same for each device of a given model or type, the voltage break points need only be stored once, also in the coefficient storage unit.

Upon power-up of the transducer, the coefficients and voltage break points are read from the coefficient storage unit and are loaded into a RAM. For a measured ambient temperature T and measured input signal frequency f, a desired full scale output variable value $P_{FS}$ is prescribed and a corresponding input variable value $V = V_{FS}$ is determined for which $P(V = V_{FS}) = P_{FS}$, using eq. (4). The input variable range, $V_o \leq V \leq V_{FS}$ is then divided into $2^q$ equal length intervals, where q is a positive integer, and the definition $$V_m = V_o + \frac{m(V_{FS} - V_o)}{2^q} \quad (m = 0, 1, 2, 3, \ldots, 2^q - 1) \tag{23}$$

is adopted. Each input variable value V in an interval such as $V_m \leq V < V_{m+1}$ is assigned a rounded value $V_m$.

Power levels $P_m$ are computed according to the prescription $$P(V=V_m) = P_m = P_{FS}P_m'. \quad (24)$$

where $P_m'$ is a normalized output variable value satisfying $0 \leq P_m' \leq 1$. Although the levels $V_m$ of the input variable are equidistantly spaced, the output variable levels $P_m$ or $P_m'$ need not be equidistantly spaced.

The normalized output variable $P_m'$ is now expressed in floating point notation, using r binary digits or bits, so that $P_m'$ is rounded up or down to an r-bit representation $P_n''$ ($n=0,1,\ldots,2^r-1$) by the prescription $$P_m' \xrightarrow{\text{round}} P_n'' \ (n = 0, 1, \ldots, 2^r - 1). \quad (25)$$

The process of rounding up or rounding down will be referred to simply as "rounding".

This rounding procedure is equivalent to the prescription $$P_m \xrightarrow{\text{round}} P_{FS}P_n'' \quad (26)$$

for rounding the non-normalized output variable value $P_m$ for floating point representation. The normalized and rounded output variable values $P_m''$ are entered into a transducer lookup table together with the corresponding quantized input variable values $V_m$. Given an input variable value $V$, the following procedure is followed.

(1) Round V to $V_m$ by quantization;
(2) Determine $P_m = P_{FS}P_m' = P(V=V_m)$;
(3) Round $P_m'$ to $P_n''$ (or $P_m = P_{FS}P_m'$ to $P_{FS}P_n''$)

To each input variable value V, the transducer lookup table assigns a rounded value $V_m$ and a corresponding rounded output variable value $P_n''$ or $P_{FS}P_n''$, and this last value is used for presentation, such as display or subsequent processing. The number r used for rounding of the output variable values $P_n''$ is equal to 16 in a preferred embodiment, which produces $2^{16}=65,536$ table entries for the output variable values. Another attractive choice is r=8, which produces 256 table entries for the output variable values.

The transducer table relating input voltage V to output power P or to normalized output power P' will be changed whenever the ambient temperature T changes or the input frequency f changes, or both change. A characteristic temperature sensitivity and a characteristic frequency sensitivity may also be determined during interpolation of the coefficients by the relationship in equation (2) above. Minor temperature drift or frequency variation can be accounted for by simply scaling the table entries rather than by complete recomputation of the table, wherever possible. A cache or supplemental memory can be provided to hold entries from the last few sets of table entries computed, and the old table entries can be saved based on use of the Most Recently Used (MRU) algorithm. Under this algorithm, the last few sets of table entries used are retained for possible future use so that the tables are not discarded and recomputed needlessly.

If 16-bit accuracy is chosen for subsequent display or processing of a normalized output variable, the dynamic range of such output variable might assign one bit to the sign of the variable and fifteen fractional bits to the magnitude of the value itself. This would allow the normalized output power p to be represented in increments of 0.000122 over a range from −1.0 up to 0.999878. If the output variable will always have one sign (i.e. always be non-negative or always be non-positive), the resolution of the output display may be doubled by use of the sign bit as an additional quantization bit.

We claim:

1. A method of generating an enhanced power output signal in a transducer having N+1 input terminals and an output terminal, in which a principal input voltage having a value $v_{in}$ is applied to a first input terminal and N supplemental input voltages having values $sv_1, \ldots sv_N$, where N is an integer $\geq 2$, are applied to respective input terminals $2, \ldots N+1$, wherein each of the input voltage signals varies over a predetermined range, and in which the transducer generates a power output signal at said output terminal having a value $v_{out}$ that serves as a measure of the value of the principal input voltage and that depends upon the values of the principal input voltage $v_{in}$ and of the N supplemental input voltages, to thereby improve the accuracy of said transducer, comprising the steps of:

(1) providing, for each of the supplemental input voltages, a predetermined first reference value and a predetermined second reference value for the supplemental input voltage $sv_1$, which serve as a lower bound and an upper bound, respectively, for the supplemental input voltage $sv_1$;

(2) providing a plurality of N-tuples of said predetermined reference values, denoted reference N-tuples, with the reference value in each position in a reference N-tuple being chosen as the first reference value or as the second reference value for one of the supplemental input voltages;

(3) measuring the values of a plurality of reference power output signals, with each such reference power output signal being defined by a choice of one of the reference N-tuples;

(4) measuring the value of an input voltage signal received at said first input terminal to define a measured input voltage signal;

(5) measuring the values of N supplemental input voltages received at input terminals $2, \ldots, N+1$, and forming an N-tuple, denoted the measured signal N-tuple, from the measured values for these N supplemental input voltages, where a measured value of a given supplemental input voltage lies between, or is equal to one of, the first reference value and the second reference value for that supplemental input voltage;

(6) receiving in an interpolator module the measured input voltage signal, the N measured supplemental input voltages, the plurality of reference N-tuples, and the plurality of reference power output signals, and generating in said interpolator module interpolation coefficient signals representing an interpolation between the plurality of reference power output signals measured in step (3), by interpolation between the plurality of reference N-tuples relative to the measured signal N-tuple received by said interpolation module;

(7) providing said interpolation coefficient signals to said transducer; and (8) producing in said transducer from said interpolation coefficient signals an interpolated power output signal $v_{out}$ at the output terminal of the transducer.

2. The method of claim 1, further comprising the steps of:

(9) defining a set of P input variable ranges for a value $v_{in}$ of said input voltage, wherein for the value $v_{in}$ lying in a range defined by $v_m \leq v_{in} \leq v_{m+1}$ (m = 1, ..., P; where P is a selected positive integer) for a predetermined sequence of values $v_1 < v_2 < ... < v_P$ of said input voltage signals, a determinable functional relationship exists between a value $v_{out}$ of said power output signal and a value $v_{in}$ of said input voltage signal $v_{in}$ of the form $$v_{out} = \sum_{k=1}^{L} a_k^{(m)}(sv_1,...sv_N) F_{k,m}(v_{in})$$

where $a_k^{(m)}(sv_1, ..., sv_N)$ (where k = 1, ..., L) is a reference value coefficient whose value depends on the reference values, denoted $sv_i$ (i = 2, 3, ..., N+1), of said N supplemental input voltages and on the range $v_m \leq v_{in} \leq v_{m+1}$ in which said input voltage signal value $v_{in}$ lies, L is a positive integer, and $F_{k,m}(in)$ is a function depending on $v_{in}$ and on the range $v_m \leq v_{in} \leq v_{m+1}$ in which $v_{in}$ lies, but not on the values of any of said supplemental input voltages;

(10) providing and storing a first set of reference value coefficients $a_k^{(m)}(sv_2', ..., sv_{n+1}')$, each such coefficient corresponding to a combination of a reference value $sv_i'$ (i = 2, ..., N+1) for each of said N supplemental input voltages for each of the P ranges of the value $v_{in}$, with each such coefficient representing an effect of a choice of values of said N supplemental input signals on the functional relationship between said power output signal and said input voltage signal;

(11) providing and storing a second set of reference value coefficients $a_k^{(m)}(sv_1'', ..., sv_N'')$, each coefficient corresponding to a combination of a reference value $sv_i''$ (i = 2, ..., N+1) for each of said N supplemental input voltages for each of the P ranges of $v_{in}$, and each such coefficient representing an effect of a choice of values of said N supplemental input signals on the functional relationship between the values $v_{out}$ and $v_{in}$;

(12) measuring the value $v_{in}$ of an input voltage signal received at said transducer, (13) measuring the values, denoted $sv_1'''$, of the supplemental input signals (i = 2, ..., N+1) received at approximately the time said input voltage signal is received at the transducer;

(14) determining a range, given by $v_2 \leq v_{in} v_{r+1}$ for some integer r, in which the measured value $v_{in}$ of said input voltage signal lies;

(15) for $v_{in}$ lying in an input signal range $v_r \leq v_{in} < v_{r+1}$, replacing the reference value coefficients $a_k^{(r)}(sv_1', ..., sv_N')$ and $a_k^{(r)}(sv_1'', ..., sv_N'')$ in the expression for $v_{out}$ set forth in step (9) above by interpolated reference value coefficients $c_k^{(r)}(sv_1''', ..., sv_N''')$ that extend the reference value coefficients from the reference values $sv_i'$ and $sv_i''$ to values $sv_i'''$ of said supplemental input signals that need not coincide with the reference values $sv_i'$ and $sv_i''$; and (16) forming said interpolated power output signal having a value $v_{out}$, determined from the measured value $v_{in}$ of said input voltage signal and from the measured value of each of said N supplemental input voltages.

3. The method of claim 2, further comprising the step of determining said reference value coefficients $a_k^{(m)}(sv_1', ..., sv_N')$ so that said power output signal values $$v_{out} = \sum a_k^{(m)}(sv_1^1, ..., sv_N^1) F_{k,m}(v_{in})$$

computed for the common endpoint $v_{in} = v_m$ in two adjacent ranges $v_{m-1} \leq v_{in} \leq v_m$ and $v_m \leq v_{in} \leq v_{m+1}$ of said input voltage signal value $v_{in}$, approximately coincide for m = 1, 2, ..., P.

4. The method of claim 3, wherein said functions $F_{k,m}(v_{in})$ are defined by the relations $$F_{k,m}(v_{in}) = \{v_{in}k\}(v_{in})^{k-1}$$

where (k = {0,}1, ..., {$L_m$} L+1).

5. The method of claim 2, further comprising the step of choosing one of said supplemental input signals $sv_i$ (i = 2, ..., N+1) to be ambient temperature of said transducer.

6. The method of claim 2, further comprising the step of choosing one of said supplemental input signals $sv_i$ (i = 2, ..., N+1) to be a frequency of time variation of said input voltage signal.

7. The method of claim 2, wherein said number N of said supplemental input voltages is two, said first supplemental input voltage value $sv_1$, denoted R, has said first and second reference values $R_1$ and $R_2$, respectively, said second supplemental input voltage value $sv_2$, denoted S, has said first and second reference values $S_1$ and $S_2$, respectively, and said step of forming said interpolated power output signal comprises determining said interpolated coefficients by the relationship $$c_k(R,S) = \{a_k^{(m)}(R_1,S_1)(R_2 - R)(S_2 - S) +$$
$$a_k^{(m)}(R_2,S_1)(R - R_1)(S_2 - S) +$$
$$a_k^{(m)}(R_1,S_2)(R_2 - R)(S - S_1) +$$
$$a_k^{(m)}(R_2,S_2)(R - R_1)(S - S_2)\}/(R_2 - R_1)(S_2 - S_1).$$

8. The method of claim 2, wherein said number N is two, said first supplemental input voltage value $sv_1$, denoted R, has said first and second reference values $R_1$ and $R_2$, respectively, said second supplemental voltage value $sv_2$, denoted S, has said first and second reference values $S_1$ and $S_2$, respectively, and said step of forming said interpolated power output signal comprises determining said interpolated coefficients by the relationship $$c_k(m)(R,S) = \sum_{p=1}^{2} \sum_{q=1}^{2} a_k^{(m)}(R_p, S_q) g_p(R) h_q(S),$$

where $$g_p(R) = \prod_{\substack{m=1 \\ m \neq p}}^{2} \frac{(R_m - R)}{(R_m - R_p)},$$

and where

-continued $$h_q(S) = \prod_{\substack{n=1 \\ n \neq q}}^{2} \frac{(S_n - S)}{(S_n - S_q)}.$$

9. The method of claim 2, wherein said number N is three, said first supplemental input signal value $sv_1$, denoted Q, has said first and second reference values $Q_1$ and $Q_2$, respectively, said second supplemental input signal value $sv_2$, denoted R, has said first and second reference values $R_1$ and $R_2$, respectively, said third supplemental signal value $sv_3$, denoted S, has said first and second reference values $S_1$ and $S_2$, respectively, and said step of forming said interpolated output signal comprises determining said interpolated coefficients by the relationship $$c_k^{(m)}(Q,R,S) = \{a_k^{(m)}(Q_1,R_1,S_1)(Q_2 - Q)(R_2 - R)(S_2 - S) +$$

$$a_k^{(m)}(Q_2,R_1,S_1)(Q - Q_1)(R_2 - R)(S_2 - S) +$$

$$a_k^{(m)}(Q_1,R_2,S_1)(Q_2 - Q)(R - R_1)(S_2 - S) +$$

$$a_k^{(m)}(Q_1,R_1,S_2)(Q_2 - Q)(R_2 - R)(S - S_1) +$$

$$a_k^{(m)}(Q_2,R_2,S_1)(Q - Q_1)(R - R_1)(S_2 - S) +$$

$$a_k^{(m)}(Q_2,R_1,S_2)(Q - Q_1)(R_2 - R)(S - S_1) +$$

$$a_k^{(m)}(Q_1,R_2,S_2)(Q_2 - Q)(R - R_1)(S - S_1) +$$

$$a_k^{(m)}(Q_2,R_2,S_2)(Q - Q_1)(R - R_1)(S - S_1)\}/(Q_2$$

$$- Q_1)(R_2 - R_1)(S_2 - S_1).$$

10. A method of generating an enhanced voltage output signal in a transducer having N+1 input terminals and an output terminal, in which a principal input power signal is applied to a first input terminal and N supplemental input signals $si_1, \ldots, si_n$, where N is an integer $\geq 2$, are applied to respective input terminals 2, $\ldots$, N+1, wherein each of the input signals varies over a predetermined range, and in which the transducer generates a voltage output signal at said output terminal having a value that serves as a measure of the value of the principal input power signal and that depends upon the values of the principal input power signal and of the N supplemental input signals, to thereby improve the accuracy of said transducer, comprising the steps of:

(1) providing, for each of the supplemental input signals, a predetermined first reference value and a predetermined second reference value for the supplemental input signal $si_i$, which serve as a lower bound and an upper bound, respectively, for the supplemental input $si_i$;

(2) providing a plurality of N-tuples of said predetermined reference values, denoted reference N-tuples, with the reference value in each position in a reference N-tuple being chosen as the first reference value or as the second reference value for one of the supplemental input signals;

(3) measuring the values of a plurality of reference voltage output signals, with each such reference voltage output signal being defined by a choice of one of the reference N-tuples;

(4) measuring the value of an input power signal received at said first input terminal to define a measured input power signal;

(5) measuring the values of N supplemental input signals received at input terminals 2, ..., N+1, and forming an N-tuple, denoted the measured signal N-tuple, from the measured values for these N supplemental input signals, where a measured value of a given supplemental input signal lies between, or is equal to one of, the first reference value and the second reference value for that supplemental input signal;

(6) receiving in an interpolator module the measured input power signal, the N measured supplemental input signals, the plurality of reference N-tuples, and the plurality of reference voltage output signals, and generating in said interpolator module interpolation coefficient signals representing an interpolation between the plurality of reference voltage output signals measured in step (3), by interpolation between the plurality of reference N-tuples relative to the measured signal N-tuple received by said interpolation module;

(7) providing said interpolation coefficient signals to said transducer; and (8) producing in said transducer from said interpolation coefficient signals an interpolated voltage output signal at the output terminal of the transducer.

11. The method of claim 10, further comprising the steps of:

(9) defining a set of P input variable ranges for a value $v_{in}$ of said input power signal, wherein for the value $v_{in}$ lying in a range defined by $v_m \leq v_{in} \leq v_{m+1}$ (m=1, ..., P; where P is a selected positive integer) for a prdetermined sequence of values $v_1 < v_2 < \ldots v_P$ of said input power signals, a determinable functional relationship exists between a value $v_{out}$ of said voltage output signal and a value $v_{in}$ of said input power signal $v_{in}$ of the form $$v_{out} = \sum_{k=1}^{L} a_k(m)_{(sv_1,\ldots sv_N)} F_{k,m}(v_{in})$$

where $a_k^{(m)}(sv_1, \ldots, sv_N)$ (where k=1 ..., L) is a reference value coefficient whose value depends on the reference values, denoted $sv_i$ (I=2, 3, ..., N+1), of said N supplemental input signals and on the range $v_m \leq v_{in} \leq v_{m+1}$ in which said input power signal value $v_{in}$ lies, L is a positive integer, and $F_{k,m(in)}$ is a function depending on $v_{in}$ and on the range $v_m \leq v_{in} \leq v_{m+1}$ in which $v_{in}$ lies, but not on the values of any of said supplemental input signals;

(10) providing and storing a first set of reference value coefficients $a_k^{(m)}(sv_2', \ldots, sv_{N+1}')$, each such coefficient corresponding to a combination of a reference value $sv_i'$ (i=2 ..., N+1) for each of said N supplemental input signals for each of the P ranges of the value $v_{in}$, with each such coefficient representing an effect of a choice of values of said N supplemental input signals on the functional relationship between said voltage output signal and said input power signal;

(11) providing and storing a second set of reference value coefficients $a_k^{(m)}(sv_1'', \ldots, sv_N'')$, each coefficient corresponding to a combination of a reference value $sv_i''$ (i=2, ..., N+1) for each of said N supplemental input signals for each of the P ranges of $V_{in}$, and each such coefficient representing an effect of a choice of values of said N supplemental input signals on the functional relationship between the values $v_{out}$ and $v_{in}$;

(12) measuring the value $v_{in}$ of an input power signal received at said transducer, (13) measuring the values, denoted $sv_i'''$, of the supplemental input signals (i=2, ..., N+1) received at approximately the time said input power signal is received at the transducer;

(14) determining a range, given by $v_r \leq v_{in} \leq v_{r+1}$ for some integer r, in which the measured value $v_{in}$ of said input voltage signal lies;

(15) for $v_{in}$ lying in an input signal range $v_r \leq v_{in} v_{r+1}$, replacing the reference value coefficients $a_k^{(r)}(sv_1', ..., sv_N')$ and $a_k^{(r)}(sv_1'', ..., sv_N'')$ in the expression for $v_{out}$ set forth in step (9) above by interpolated reference value coefficients $c_k(r)(sv_1''', ..., sv_N''')$ that extend the reference value coefficients from the reference values $sv_i'$ and $sv_i''$ to values $sv_i'''$ of said supplemental input signals that need not coincide with the reference values $sv_i'$ and $sv_1''$; and (16) forming said interpolated voltage output signal having a value $v_{out}$, determined from the measured value $v_{in}$ of said input power signal and from the measured value of each of said N supplemental input signals.

12. The method of claim 11, further comprising the step of determining said reference value coefficients $a_k^{(m)}(sv_1', ..., sv_N')$ so that said voltage output signal values $$v_{out} = \Sigma \Delta_k^{(m)}(sv_1^1, ..., sv_N^1) F_{k,m}(v_{in})$$

computed for the common endpoint $v_{in}=v_m$ in two adjacent ranges $v_{m-1} \leq v_{in} \leq v_m$ and $v_m \leq v_{in} \leq v_{m+1}$ of said input power signal value $v_{in}$, approximately coincide for m=1,2, ..., P.

13. The method of claim 12, wherein said functions $F_{k,m}(v_{in})$ are defined by the relations $$F_{k,m}(v_{in}) = \{v_{in}\}k)(v_{in})^{k-1}$$

where (k={0,}1, ..., {L_m}L+1).

14. The method of claim 11, further comprising the step of choosing one of said supplemental input signals $sv_i$ (i=2, ..., N+1) to be ambient temperature of said transducer.

15. The method of claim 11, further comprising the step of choosing one of said supplemental input signals $sv_i$ (i=2, ..., N+1) to be a frequency of time variation of said input power signal.

16. The method of claim 11, wherein said number N of said supplemental input signals is two, said first supplemental input signal value $sv_1$, denoted R, has said first and second reference values $R_1$ and $R_2$, respectively, said second supplemental input signal value $sv_2$, denoted S, has said first and second reference values $S_1$ and $S_2$, respectively, and said step of forming said interpolated voltage output signal comprises determining said interpolated coefficients by the relationship $$c_k(R,S) = \{a_k^{(m)}(R_1,S_1)(R_2 - R)(S_2 - S) +$$
$$a_k^{(m)}(R_2,S_1)(R - R_1)(S_2 - S) +$$
$$a_k^{(m)}(R_1,S_2)(R_2 - R)(S - S_1) +$$
$$a_k^{(m)}(R_2,S_2)(R - R_1)(S - S_2)\}/(R_2 - R_1)(S_2 - S_1).$$

17. The method of claim 11, wherein said number N is two, said first supplemental input signal value $sv_1$, denoted R, has said first and second reference values $R_1$ and $R_2$, respectively, said second supplemental signal value $sv_2$, denoted S, has said first and second reference values $S_1$ and $S_2$, respectively, and said step of forming said interpolated voltage output signal comprises determining said interpolated coefficients by the relationship $$c_k(m)(R,S) = \sum_{p=1}^{2} \sum_{q=1}^{2} a_k^{(m)}(R_p, S_q) g_p(R) h_q(S),$$

where $$g_p(R) = \prod_{\substack{m=1 \\ m \neq p}}^{2} \frac{(R_m - R)}{(R_m - R_p)},$$

and where $$h_q(S) = \prod_{\substack{n=1 \\ n \neq q}}^{2} \frac{(S_n - S)}{(S_n - S_q)}.$$

18. The method of claim 11, wherein said number N is three, said first supplemental input signal value $sv_1$, denoted Q, has said first and second reference values $Q_1$ and $Q_2$, respectively, said second supplemental input signal value $sv_2$, denoted R, has said first and second reference values $R_1$ and $R_2$, respectively, said third supplemental signal value $sv_3$, denoted S, has said first and second reference values $S_1$ and $S_2$, respectively, and said step of forming said interpolated voltage output signal comprises determining said interpolated coefficients by the relationship $$c_k^{(m)}(Q,R,S) = \{a_k^{(m)}(Q_1,R_1,S_1)(Q_2 - Q)(R_2 - R)(S_2 - S) +$$
$$a_k^{(m)}(Q_2,R_1,S_1)(Q - Q_1)(R_2 - R)(S_2 - S) +$$
$$a_k^{(m)}(Q_1,R_2,S_1)(Q_2 - Q)(R - R_1)(S_2 - S) +$$
$$a_k^{(m)}(Q_1,R_1,S_2)(Q_2 - Q)(R_2 - R)(S - S_1) +$$
$$a_k^{(m)}(Q_2,R_2,S_1)(Q - Q_1)(R - R_1)(S_2 - S) +$$
$$a_k^{(m)}(Q_2,R_1,S_2)(Q - Q_1)(R_2 - R)(S - S_1) +$$
$$a_k^{(m)}(Q_1,R_2,S_2)(Q_2 - Q)(R - R_1)(S - S_1) +$$
$$a_k^{(m)}(Q_2,R_2,S_2)(Q - Q_1)(R - R_1)(S - S_1)\}/(Q_2 - Q_1)(R_2 - R_1)(S_2 - S_1).$$

* * * * *